May 23, 1950     D. L. ELAM     2,508,996
DETONATION INDICATOR
Filed Feb. 21, 1946
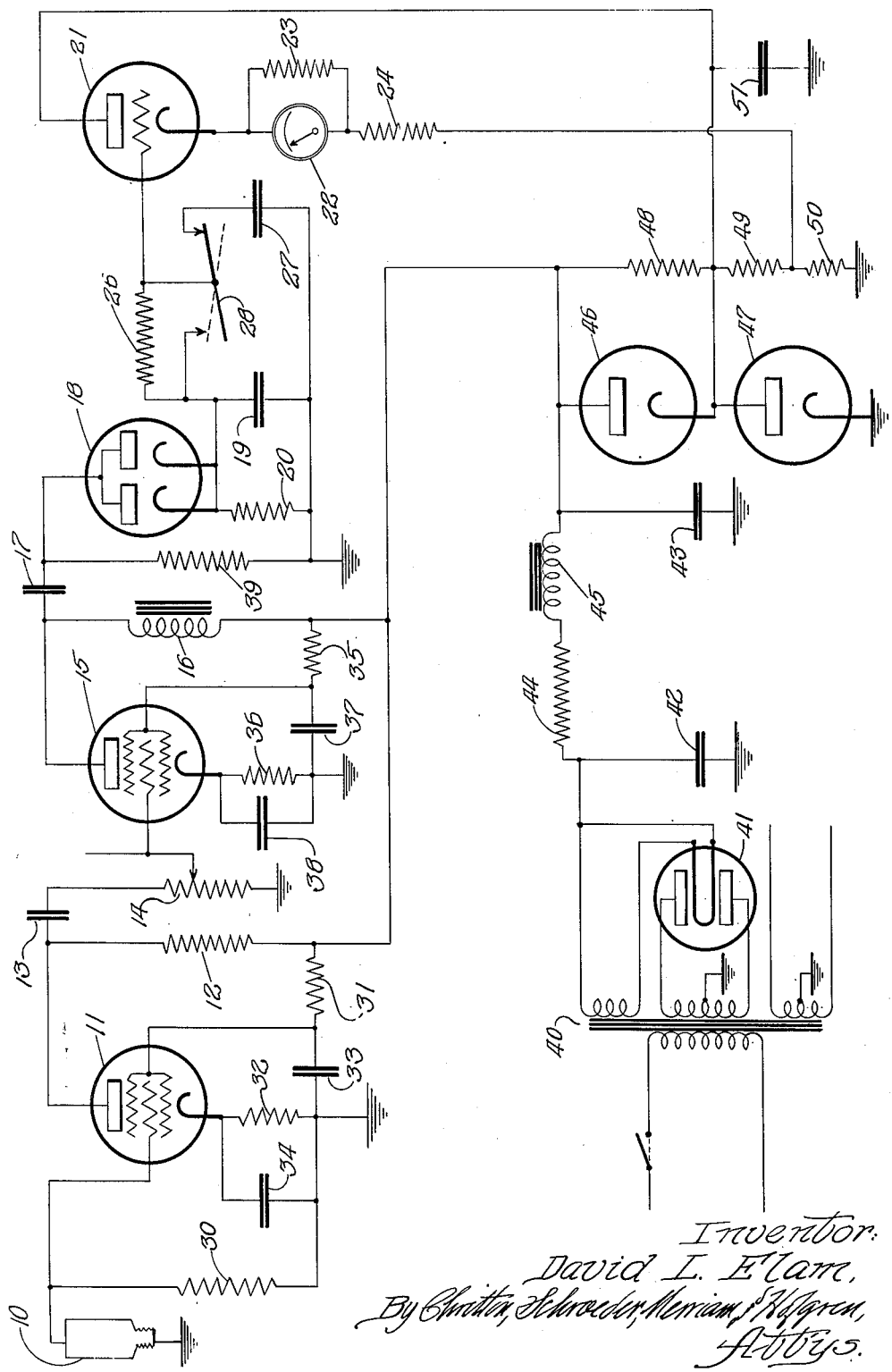
Inventor:
David L. Elam,
By Christy, Schroeder, Merriam & Hofgren,
Attys.

Patented May 23, 1950

2,508,996

UNITED STATES PATENT OFFICE 2,508,996

DETONATION INDICATOR

David L. Elam, Roselle, Ill., assignor to
Alfred Crossley

Application February 21, 1946, Serial No. 649,361

1 Claim. (Cl. 171—95)

This invention relates to a detonation indicator, and more particularly to improved means for indicating detonation effects occurring in an engine or the like.

Previous detonation indicators or "knock meters" have operated on what may be termed an averaging basis. Certain types of investigation of fuel and engine characteristics are more interested in the peak strength of the brief duration detonation pressure surges rather than in their average amplitude. While a fuel manufacturer may be more interested in the average character of detonation impulses, an engine manufacturer may be more interested in the peak pressures developed in the engine, even though these particular high pressures occur only infrequently.

I have developed and am here disclosing a detonation indicator so arranged as to provide a readable indication of rate of pressure changes occurring in an engine as a result of detonation phenomena, even though these high-rate-of-change impulses are of exceedingly brief duration and occur only infrequently. I secure this desired result by converting pressure variations in the engine into corresponding electrical impulses; amplifying the impulses and eliminating undesired low frequency or low amplitude impulses; rectifying the high amplitude high frequency detonation impulses under conditions which retain their peak values and provide sufficient power for indicating purposes; and by using the desired impulses to actuate indicating means so arranged that even the briefest impulse will provide an indication which is a function of the peak values of such impulse. I also provide a very simple but effective means of selectively operating my system in the manner just described or in a manner designed to average the detonation impulses and provide an indication of their average rather than peak intensity, so that a detonation indicating system embodying my inventions may be conveniently used to provide information as to the peak values of detonation impulses or as to their average values.

One feature of this invention is that it provides a new and improved detonation indicating system; another feature of this invention is that it is adapted to provide an indication of the peak values of detonation pressure waves in an engine as distinguished from their average amplitude; yet another feature of this invention is that the system may be used selectively to provide peak impulse indications or averaging indications of the detonation phenomena; and other features and advantages of this invention will appear from the following specification and the drawing, which is a circuit diagram of one embodiment of my inventions.

There are cases where it is desirable to provide a readable indication of the peak value of certain high frequency impulses, as the high frequency pressure waves comprising detonation phenomena in an internal combustion engine. Detonation or "knock" indications have heretofore been most commonly provided by a system employing a "bouncing pin" pickup operated by opening and closing contacts. The assignee of this application has done development work in an improvement for indicating detonation phenomena. In general, this comprises use of a pickup for translating pressure variations into corresponding electrical impulses, and then using means for amplifying the electrical impulses, effecting certain sorting or discriminating operations, and using the resultant desired amplified impulses to operate visually readable indicating means. A general description of such systems and of pickups usable therein will be dispensed with here, and reference may be made, if desired, to the copending Crossley and Elam application Serial No. 498,370, filed August 12, 1943, and issued on February 25, 1947, as Patent No. 2,416,614 for a previous disclosure of a somewhat different type of complete detonation indicating system; and to the copending Kamler and Elam application Serial No. 495,610 filed July 21, 1943, now Patent No. 2,396,703, issued March 19, 1946; or my copending application Serial No. 610,325, filed August 11, 1945, now abandoned, for a disclosure of pickups usable for converting the pressure impulses into corresponding electrical impulses.

The particular embodiment of my inventions illustrated in the accompanying drawing was designed for test work on any internal combustion engine, including a one-cylinder engine especially designed for such work and known as a CFR (Consolidated Fuel Research) engine. The detonation or "knock" frequencies which are of interest to fuel and engine manufacturers have a frequency which is primarily a function of the cubical content of the cylinder under test, although it varies slightly as a function of mixture and other variables in engine operation. The detonation frequencies may range from 2,000 cycles per second (in quite large Diesel engines) up to as high as 20,000 cycles per second (in very small, high-speed engines as outboard motors) the knock frequencies in a standard CFR engine being normally in the range of 6,000 to 7,000 cycles per second, so that the system disclosed herewith uses coupling condensers and other circuit components designed with detonation impulse frequencies in the neighborhood of 6,500 cycles per second in mind.

Referring now more particularly to the circuit diagram in the drawing, the particular system illustrated comprises a pickup 10 (which may be of the character shown in the above-mentioned Kamler and Elam application 495,610, for example) adapted to be screwed into an opening in the engine cylinder and to translate pressure variations therein into corresponding electrical variations or impulses. These impulses are then delivered to the signal grid of input tube 11, which may be of tube type No. 6SJ7, for example. The output of this tube is shown as developed across a conventional plate circuit resistor 12, passed through a coupling and filter condenser 13, and developed across a variable volume control potentiometer 14 having its movable contact connected to the signal grid of the tube 15, which may be of tube type No. 6V6, for example. The output of this tube is developed across a plate circuit choke coil 16, and passed through a coupling condenser 17 to be applied to a rectifying tube 18, which may, for example, be of tube type No. 6H6 with its cathodes and anodes tied together to operate as a half-wave rectifier. The impulses passing through the rectifying tube 18 operate to charge a condenser 19 which has a very high value resistor 20 in shunt therewith, so that the potential difference existing across the condenser 19 is a function of the peak voltages of the impulses applied thereto. This potential difference is used, either indirectly or through an integrating circuit, to determine the cathode-grid bias in the meter tube 21, which may for example be of tube type No. 6J5GT. The cathode circuit of this meter tube includes a milliammeter 22 with a relatively low value "dead beat" resistor 23 in shunt therewith, the value usually being low and being determined by the resistance of the meter; and a high value degenerative resistor 24 in series therewith, this resistor having a value many times that of the resistor 23. The indications of the meter 22 is thus a function of the space current flow through the tube 21, in turn determined by the potential difference existing across the condenser 19.

The ordinary pressures developed by the explosion in an internal combustion engine are accompanied, under certain conditions, by high frequency detonation pressure impulses which go up to a value considerably higher than that of the explosion pressures. The regular explosion impulses are relatively low frequency impulses (15 explosions per second, at 1800 R. P. M., for example) whereas the detonation impulses have the characteristics of high frequency waves, being in the neighborhood of 6500 cycles per second in a CFR engine, as explained heretofore. These detonation impulses are accompanied by certain other high frequency impulses, as mechanical waves set up by valve operation and the like.

In the particular system here disclosed, the two tubes 11 and 15 are preferably operated as straight class A amplifiers and are so selected and arranged as to give high gain with a relatively high power output from the tube 15. For example, the two stages shown here provide an over-all gain of the order of 5,000 times in actual practice, and a 6V6 type tube in the second stage provides substantial power delivery to the rectifier tube to build up a charge across the condenser 19 fast enough to give a quite true indication of the real peak amplitude of an individual impulse, the tube being capable of operating as a class A amplifier without any rectification in itself of the peaks of the waves.

While the condenser 13 may be of any value appropriate to a coupling condenser, it is here shown as of relatively high impedance to reduce the transfer of low frequency waves (as for example the low frequency explosion pressure waves in the example given), a .00025 microfarad condenser having proved satisfactory in practice, although I sometimes use condensers with an impedance of several times this value. This condenser can thus provide attenuation for low frequency impulses, so that the only appreciable input to the tube 15 comprises the detonation impulses and other low amplitude, high frequency impulses as those associated with valve operation, for example. In order to dispose of these low amplitude, high frequency impulses, a certain predetermined negative bias is applied to the meter tube 21 (53 volts negative having proved satisfactory in practice with the tube type mentioned), and the variable volume control 14 is then adjusted until there is just barely no meter reading under conditions in which there is an absence of knock in the engine, as determined by ear. This adjustment is preferably made after the engine has been run for a sufficient period to stabilize its operation, as in the neighborhood of a half hour, and been adjusted so that there is no knock.

Variations in engine mixture, ignition, or other conditions which then result in detonations create detonation impulses in the system which have an amplitude high enough to over-ride the conditions to which the system was previously adjusted and to set up potential differences across the condenser 19 which vary the bias on the meter tube 21 and result in an indication on the milliammeter 22.

In order to get a satisfactory indication of the maximum peak values of detonation impulses I find it desirable to so relate the values of the condenser 19 and the resistor 20 that the time constant of this circuit is quite long, at least in excess of one-quarter minute and preferably of the order of about one minute. I have found a satisfactory combination to comprise a one-quarter microfarad condenser in conjunction with a 200 megohm resistor. With the low side of the condenser 19 connected to the cathode of the tube 21 (through ground) and the upper side connected to the grid of such tube, high peak value detonation impulses charge the condenser to a corresponding potential, the peak voltage resulting from each impulse requiring a longer time to leak off through the resistor 20 than the time period between detonation impulses. Since the potential difference across the condenser 19 determines the flow of space current through the tube 21 and thus through the milliammeter 22, the milliammeter needle immediately goes up to a point indicative of the peak of the very brief detonation impulse, and backs down the scale at a very slow rate so that the reading of the peak value reached is very easy. Moreover, if a higher peak value impulse comes through later, the condenser 19 is charged to a higher potential and the needle immediately swings up to a higher position. The degenerative resistor 24 provides practically no effect on meter operation at the beginning of an upswing, but becomes increasingly effective as the bias voltage on the tube 21 rises, resulting in a meter action which is progressively compressed toward the upper part of the scale. This arrangement provides maximum sensitivity at the lower end of the scale together with the ability to handle the wide variations in detonation sometimes encountered. As will be readily apparent, when the potential across the condenser 19 is used to control the bias on the tube 21 directly, the meter provides an indication of the maximum rate of change of pressure conditions reached by detonation waves in the engine, even though excessive peaks may occur only once in several hundreds of explosions in the cylinder.

In order to enable the system to be selectively operated to provide an average detonation indication more in the nature of that described in the above-mentioned Crossley and Elam application 498,370, I provide an integrating circuit comprising a resistor 26 adapted to be in series between one side of the condenser 19 and the grid of the tube 21, and a condenser 27 adapted to be in shunt with the cathode and grid of this tube. To facilitate operation of this system selectively either as a peak pressure indicator or as an averaging indicator of detonation, I provide a switch 28. When the switch 28 is in the position indicated in solid lines in the drawing, the integrating circuit is in operation, with the resistor 26 in series with the grid of the tube 21, and the resistor 27 in shunt across the cathode and grid. As will be readily understood, this additional circuit serves as a filter to average out potential differences occurring across the condenser 19. In the particular circuit described I have achieved quite satisfactory results by using an additional condenser 27 of a value of one microfarad and making the resistor 26 of a value of about 10 megohms. On the other hand, when the switch 28 is in the position shown in dotted lines, the condenser 27 is open circuited and the resistor 26 shorted, so that potentials existing across the condenser 19 are applied directly to the grid of the tube 21.

In the particular circuit illustrated and with the tube types mentioned, I have achieved satisfactory results by using with the tube 11 a one megohm grid resistor 30, a two megohm screen resistor 31 and a 1300 ohm cathode resistor 32; and by making the by-pass condensers 33 and 34 of .5 microfarad and 50 microfarads, respectively. The coupling to the next tube may comprise a .5 megohm plate resistor 12, a .00025 microfarad coupling condenser 13, as mentioned heretofore, and a variable volume control resistor 14 with a maximum of .5 megohm. The tube 15, as of the 6V6 tube type number, may have associated with it a screen grid resistor 35 of 8000 ohms and a cathode resistor 36 of 300 ohms, with by-pass condensers 37 and 38 having values of .9 and 50 microfarads, respectively. The coupling to the rectifier tube 18 may comprise a .1 microfarad condenser 17 and a 15000 ohm resistor 39. The values of the bias developing and integrating circuits between the tubes 18 and 21 have heretofore been specified; and the resistors 23 and 24 associated with the meter 22 may have values of 10 ohms and 10,000 ohms respectively.

An appropriate power supply for the system may be derived from a generally conventional power pack including a transformer 40 adapted to have its primary connected to a conventional alternating current source, as 110 volt, 60 cycle A. C. The high voltage secondary of this transformer 40 may have its center tap grounded and its ends connected to the plates of a full-wave rectifier 41, which may for example be of tube type No. 5Y3GT. Cathode heating current for this rectifier tube may be supplied in conventional manner from one low voltage secondary of the transformer 40 and another low voltage secondary may supply heating current for the tubes in the operative portion of the circuit described heretofore, these connections not being shown since they would unduly complicate the circuit diagram.

The pulsating direct current developed between ground and the cathode of the tube 41 is applied to a filter here shown as comprising condensers 42 and 43 (which may be of 10 microfarad capacity each) a resistor 44 (which may have a value of 400 ohms) and a choke 45 which may have a value of 350 microhenries. I prefer to stabilize the output by connecting between the positive output terminal and ground two voltage regulator tubes 46 and 47 (which may be of tube type No. VR150), the resultant output being developed across a bleeder resistor system comprising the resistor sections 48, 49 and 50, which may be of 15,000 ohms, 10,000 ohms and 5,000 ohms, respectively, with a by-pass condenser 51 of 10 microfarad capacity, for example, shunting the lower half of the bleeder resistor system. This particular power pack provides about 300 volts for operation of the tubes 11 and 15, 150 volts plate supply for the tube 21 (from the center tap of the bleeder resistor system), and in the neighborhood of 50 volts bias for the cathode circuit of the tube 21 (by a lead taken off between the resistor sections 49 and 50).

While I have shown and described certain embodiments of my invention, it is to be understood that it is capable of many modifications. Changes, therefore, in the construction and arrangement may be made without departing from the spirit and scope of the invention as disclosed in the appended claim.

I claim:

Apparatus of the character described for providing a desired indication of high frequency phenomena occurring during the operation of an internal combustion engine from impulses derived from means for translating pressure variations in said engine into corresponding electrical impulses, including: a circuit for amplifying said impulses and eliminating undesired electrical variations; apparatus for rectifying said impulses; a condenser so connected as to be charged by said rectified impulses; a high value resistor in shunt with said condenser, the time constant of the resistor-condenser combination being in excess of one-quarter minute; a tube having grid, plate and cathode elements; an integrating circuit comprising a resistor adapted to be connected in series between one side of said condenser and said grid, and a second condenser adapted to be connected in shunt with the cathode and grid; connections including a switch for selectively supplying grid-cathode bias for said tube directly from said condenser or through said integrating circuit; a milliammeter in the cathode circuit of said tube; a resistor in shunt with said meter; and a resistor in the cathode circuit in series with said meter, this series resistor having a resistance many times that of the resistor in shunt with the meter to degeneratively vary the bias on said tube, whereby the upper range of meter reponse is compressed.

DAVID L. ELAM.

REFERENCES CITED

The following references are of record in the file of this patent:

UNITED STATES PATENTS

| Number | Name | Date |
|---|---|---|
| 2,014,102 | Conklin | Sept. 10, 1935 |
| 2,323,762 | George | July 6, 1943 |
| 2,337,522 | Eldredge | Dec. 21, 1943 |
| 2,340,714 | Traver et al. | Feb. 1, 1944 |
| 2,350,545 | Bradford | June 6, 1944 |
| 2,405,133 | Brown | Aug. 6, 1946 |
| 2,416,614 | Crossley et al. | Feb. 25, 1947 |